(12) United States Patent
Mine (10) Patent No.: US 9,131,197 B2
(45) Date of Patent: Sep. 8, 2015

(54) IMAGING APPARATUS CAPABLE OF CONTROLLING EXPOSURE INCLUDING FLASH AMOUNT CONTROL OF FLASH APPARATUS, AND CONTROL METHOD THEREOF

(75) Inventor: Yosuke Mine, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 13/545,767

(22) Filed: Jul. 10, 2012

(65) Prior Publication Data

US 2013/0016249 A1 Jan. 17, 2013

(30) Foreign Application Priority Data

Jul. 14, 2011 (JP) .................................. 2011-155908

(51) Int. Cl.
*H04N 5/235* (2006.01)
*H04N 9/64* (2006.01)
*H04N 9/04* (2006.01)

(52) U.S. Cl.
CPC ............. *H04N 9/643* (2013.01); *H04N 5/2351* (2013.01); *H04N 5/2353* (2013.01); *H04N 5/2354* (2013.01); *H04N 9/045* (2013.01)

(58) Field of Classification Search
None
See application file for complete search history.

(56) References Cited

U.S. PATENT DOCUMENTS 7,920,205 B2 4/2011 Awazu

FOREIGN PATENT DOCUMENTS

| CN | 100586195 C | 1/2010 |
|----|-------------|--------|
| JP | 05-041830 A | 2/1993 |
| JP | 11-275454 A | 10/1999 |
| JP | 2003-18456 A | 1/2003 |
| JP | 2005-065186 A | 3/2005 |
| JP | 2006-135601 A | 5/2006 |
| JP | 2009-94997 A | 4/2009 |
| JP | 2009-535865 A | 10/2009 |

OTHER PUBLICATIONS

English Translation of JP 2005065186.*

* cited by examiner

Primary Examiner — Twyler Haskins
Assistant Examiner — Angel L Garces-Rivera
(74) Attorney, Agent, or Firm — Canon USA Inc. IP Division (57) ABSTRACT

There is provided an imaging apparatus capable of reducing effects given by an object outside a dynamic range of the camera, and capturing an object image with appropriate exposure, when a camera performs imaging. The imaging apparatus is configured to separate image data into a plurality of blocks, extract a specific-color block using an average value of each color component acquired using only a pixel group whose pixel output is included within a predetermined range and the number of the groups, set a weighting coefficient of an exposure-amount calculation for the block to be determined as the specific color, and set the exposure based on the weighting coefficient and an average value of brightness acquired using only the pixel groups whose pixel output and the average value of the brightness of the block are included within the predetermined range.

24 Claims, 7 Drawing Sheets

IMAGE DATA

FIG.5B
200

| (0, 0) | (1, 0) | (2, 0) | (3, 0) |
| (0, 1) | (1, 1) | (2, 1) | (3, 1) |
| (0, 2) | (1, 2) | (2, 2) | (3, 2) |
| (0, 3) | (1, 3) | (2, 3) | (3, 3) |

SEPARATE IMAGE DATA INTO BLOCKS

FIG.5C

BREAK UP GROUP ((3, 3) BLOCKS)

FIG.5D
220

| 0 | 25 | 38 | 10 |
| 0 | 35 | 40 | 10 |
| 0 | 25 | 40 | 10 |
| 5 | 40 | 40 | 28 |

NUMBER OF GROUPS WITHIN PREDETERMINED RANGE

FIG.5E

| 40 | 30 | 25 | 35 |
| 40 | 25 | 20 | 35 |
| 40 | 20 | 15 | 25 |
| 35 | 10 | 10 | 20 |

BRIGHTNESS AVERAGE VALUE

FIG.5F

|  | 20 | 20 |  |
|  | 20 | 20 |  |
|  | 15 | 15 |  |
|  | 10 | 10 |  |

BRIGHTNESS AVERAGE VALUE WITHIN PREDETERMINED REGION

FIG.5G

| 140 | 140 |
| 128 | 128 |
| 110 | 110 |
| 140 | 140 |
| 128 | 128 |
| 110 | 110 |
| 115 | 120 |
| 85  | 100 |
| 64  | 60  | 50 |
| 50  | 51  | 50 |
| 32  | 55  | 50 |

AVERAGE VALUE FOR EACH COLOR COMPONENT (R/G/B) WITHIN PREDETERMINED RANGE

FIG.5H
230

| 5 | 20 | 50 | 5 |
| 5 | 40 | 50 | 5 |
| 5 | 10 | 50 | 5 |
| 5 | 10 | 10 | 10 |

TOTAL OF WEIGHING COEFFICIENTS: 285

FIG.5I

| 40 | 20 | 20 | 35 |
| 40 | 20 | 20 | 35 |
| 40 | 15 | 15 | 25 |
| 35 | 10 | 10 | 5 |

AVERAGE VALUE OF BRIGHTNESS VALUES ((E) OR (F))

FIG.5J

| 200 | 400 | 1000 | 175 |
| 200 | 800 | 1000 | 175 |
| 200 | 200 | 750  | 125 |
| 175 | 100 | 100  | 50  |

TOTAL OF MULTIPLICATION VALUES ((F) × (G)): 5650

TARGET VALUE (J) ÷ (H) = 19.8

| RATIO OF GROUP WITHIN PREDETERMINED RANGE (%) | SPECIFIC COLOR | | | NON-SPECIFIC COLOR |
|---|---|---|---|---|
| | SKIN COLOR | GILDED FOLDING SCREEN | MIRROR | |
| 0~24 | — | — | — | 5 |
| 25~49 | — | — | — | 5 |
| 50~70 | 20 | 6 | 6 | 10 |
| 70~80 | 30 | 5 | 5 | 10 |
| 80~90 | 40 | 4 | 4 | 10 |
| 90~100 | 50 | 4 | 4 | 10 |

IMAGING APPARATUS CAPABLE OF CONTROLLING EXPOSURE INCLUDING FLASH AMOUNT CONTROL OF FLASH APPARATUS, AND CONTROL METHOD THEREOF

BACKGROUND OF THE INVENTION

1. Field of the Invention

The present invention relates to an imaging apparatus capable of performing flash imaging with appropriate exposure control and an appropriate amount of flash of an object having a specific color, and a control method thereof.

2. Description of the Related Art

Japanese Patent Application Laid-Open No. 05-041830 discusses a technique for detecting, when an image of a person is captured, a face of a person within an imaging screen, and setting exposure value to capture a face detection region with appropriate brightness.

Further, Japanese Patent Application Laid-open No. 2005-065186 discusses a technique for, when flash-imaging is performed, calculating difference between a no-flash image and a pre-flash image of a flash apparatus, extracting reflected light of an object that includes only the light of the flash apparatus, to detect the specific color using that the light source color of the flash apparatus is known.

However, according to the above-described conventional technique, if the object is near the flash apparatus when the flash imaging is performed, or if an object that specularly reflects the flash light is captured, a dynamic range of an image sensor may not be sufficient, thereby failing to accurately detecting a skin color.

Further, according to the above-described conventional technique, a captured image is separated into blocks and a weight coefficient of an amount of flash is varied at a ratio of the skin color included in a block. Therefore, in a case where a large amount of the skin color is included and an object having a high reflection rate is also included in the block, the block is largely weighed to determine the amount of the flash. As a result, the face cannot be captured with appropriate exposure amount. If the number of the separated blocks is increased, the above-described problem can be decreased, however, a processing time for calculation is increased accordingly.

SUMMARY OF THE INVENTION

The present invention is directed to an imaging apparatus capable of reducing effects given by an object having a signal value outside the dynamic range of an image in an imaging screen, and a control method thereof.

According to an aspect of the present invention, an imaging apparatus includes an imaging unit, a generation unit configured to generate image data including a plurality of color components from output of the imaging unit, a white balance control unit configured to adjust white balance of the image data, a brightness calculating unit configured to calculate, for each block of a plurality of blocks into which the image data is separated, an average value of brightness of pixel groups including a plurality of color components whose pixel output is included within the predetermined range, a specification unit configured to specify a block within a predetermined range including a predetermined number or more of the pixel groups whose pixel output is included within the predetermined range, and an exposure-amount calculation unit configured to calculate an amount of exposure when the imaging unit captures an image using the average value as a brightness value of the block within the predetermined range.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
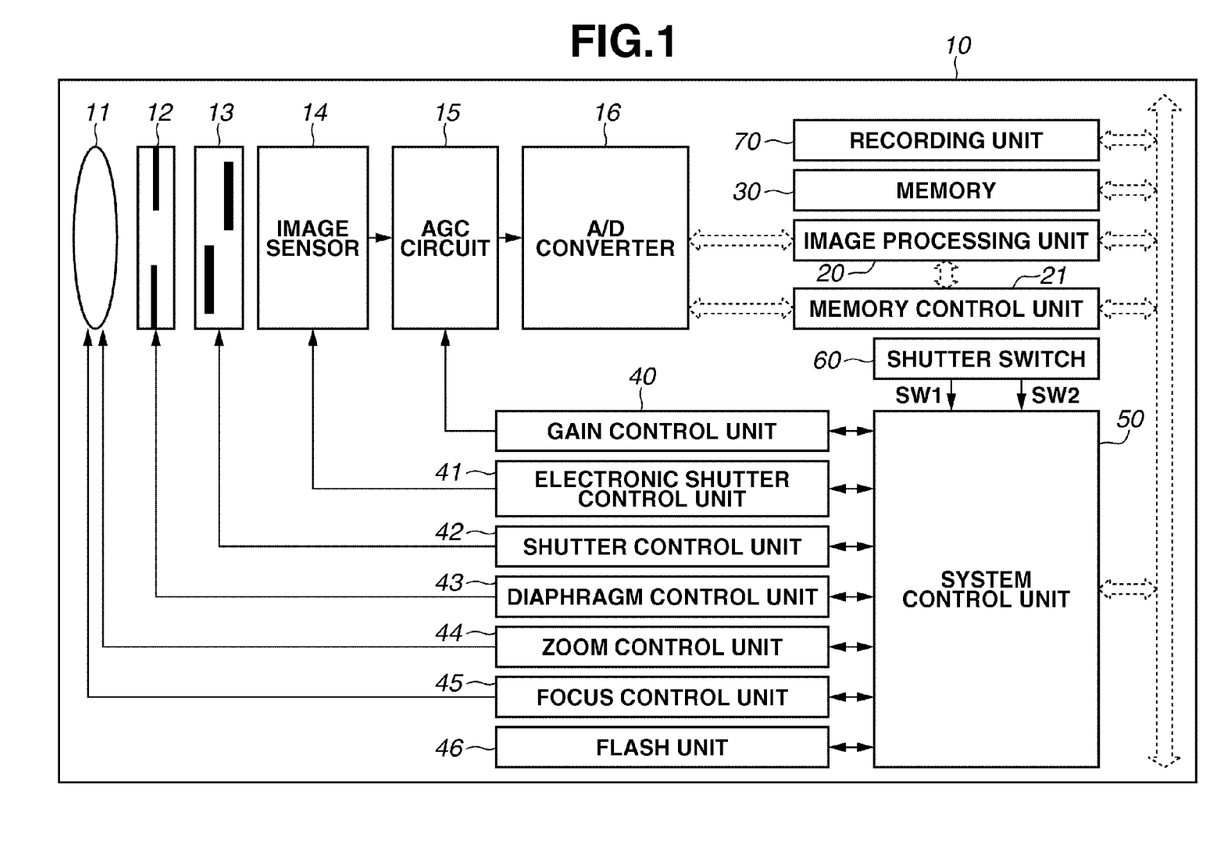
FIG. 1 is a block diagram illustrating a configuration of an imaging apparatus according to a first exemplary embodiment.

FIG. 1 is a block diagram illustrating a digital camera 10 as an example of an imaging apparatus according to the present exemplary embodiment. In FIG. 1, solid line arrows each represent a signal line such as a control line, and broken line arrows each represent a communication line.

An imaging lens 11 is moved according to a control signal from a zoom control unit 44 or a control signal from a focus control unit 45. A diaphragm 12 is opened/closed according to a diaphragm control signal output from a diaphragm control unit 43 to control an amount of incident light. A shutter 13 is moved according to a shutter control signal transmitted from a shutter control unit 42.

According to an electronic shutter control signal transmitted from an electronic shutter control unit 41, an image sensor 14 converts an optical image (object image) formed by the light flux led through an optical system including the imaging lens 11, the diaphragm 12, and the shutter 13 into an electric signal, and outputs the converted electric signal to an auto gain control (AGC) circuit 15.

According to a gain control signal transmitted from a gain control unit 40, the AGC circuit 15 adjusts the gain of the image data transmitted from the image sensor 14 and outputs the adjusted image data to an analog/digital (A/D) converter 16.

The A/D converter 16 performs A/D conversion on the image data transmitted from the AGC circuit 15 and on which the gain is adjusted. The A/D converted image data is written into a memory 30 via an image processing unit 20 and a memory control unit 21, or directly from the memory control unit 21 not via the image processing unit 20.

The image processing unit 20 performs image processing such as predetermined pixel correction processing, auto white balance (AWB) processing, color conversion processing, and specific color data extraction on the data from the A/D converter 16 or the data from the memory control unit 21. According to the present exemplary embodiment, the A/D converted image data has signal values of red (R), green (G), and blue (B) arranged in the Bayer array, and the image processing unit 20 performs pixel interpolation processing so that each pixel has the signal values of R, G, and B.

Subsequently, the image processing unit 20 performs the AWB processing and the color conversion processing to convert the signal values of the R, G, and B into the signal values of brightness "Y" and color difference UV, and then outputs the converted signal values. However, the example of the signal of the input image data and that of the image data output from the image processing unit 20 are not limited thereto.

Further, the image processing unit 20 performs predetermined calculation processing using captured image data, and a system control unit 50 controls each unit based on the acquired calculation result. For example, auto focus processing of a through the lens (TTL) system is performed on the focus control unit 45.

Furthermore, auto exposure (AE) processing is performed on the gain control unit 40, the electronic shutter control unit 41, the shutter control unit 42, the diaphragm control unit 43, and a flash unit 46. Moreover, flash pre-emission (EF) processing is performed on the flash unit 46. Further, the image data stored in the memory 30 is read and transmitted to a recording unit 70.

The memory control unit 21 controls the A/D converter 16, the image processing unit 20, and the memory 30. The gain control unit 40 transmits to the AGC circuit 15 a signal for instructing a gain value for applying thereof to a signal output from the image sensor 14.

The electronic shutter control unit 41 controls the image sensor 14 to control timing for starting storage of charge to be stored into the image sensor 14 and an amount of the storage thereof. The shutter control unit 42 controls the shutter 13 to control a shutter speed. The diaphragm control unit 43 controls an aperture size of the diaphragm 12 to control the light flux to be led to the image sensor 14.

The zoom control unit 44 controls the lens position of the imaging lens 11 to control zooming. The focus control unit 45 controls the lens position of the imaging lens 11 to control focusing.

The flash unit 46 has a light projecting function of AF auxiliary light and a flash-light adjustment function. The light adjustment function is a technique for detecting the reflected light and the specific color of the object with the pre-flash and determining an amount of flash to appropriately obtain the object image. Further, when the flash unit includes a bounce mechanism, an amount of pre-flash and specific-color detection processing are changed depending on a bounce position.

The system control unit 50 controls overall operations of the digital camera 10 by transmitting a control signal to each unit. The memory 30 stores constants, variables, and programs for the operation of the system control unit 50. Further, the memory 30 is used as an operation memory of a processing movement performed by each unit.

A shutter switch 60 includes shutter switches SW1 and SW2. The shutter switch SW1 is turned on while a shutter button (not illustrated) is being operated, and gives an instruction for starting operations of the AF processing and the AE processing. The shutter switch SW2 is turned on when the operation of the shutter button (not illustrated) has been completed.

In a flash imaging mode, by turning on the shutter switch SW2, a user can instruct starting of controlling the flash unit 46 to flash, and of performing exposure processing for writing the signal read from the image sensor 14 into the memory 30 via the A/D converter 16 and the memory control unit 21, as image data. Further, is the user can instruct starting of operations of a series of processing including development processing using calculation performed by the image processing unit 20 and the memory control unit 21, and recording processing for reading the image data from the memory 30 and writing the image data into the recording unit 70. The recording unit 70 records an image signal transmitted from the image processing unit 20 in a recording medium.

Figure 2:
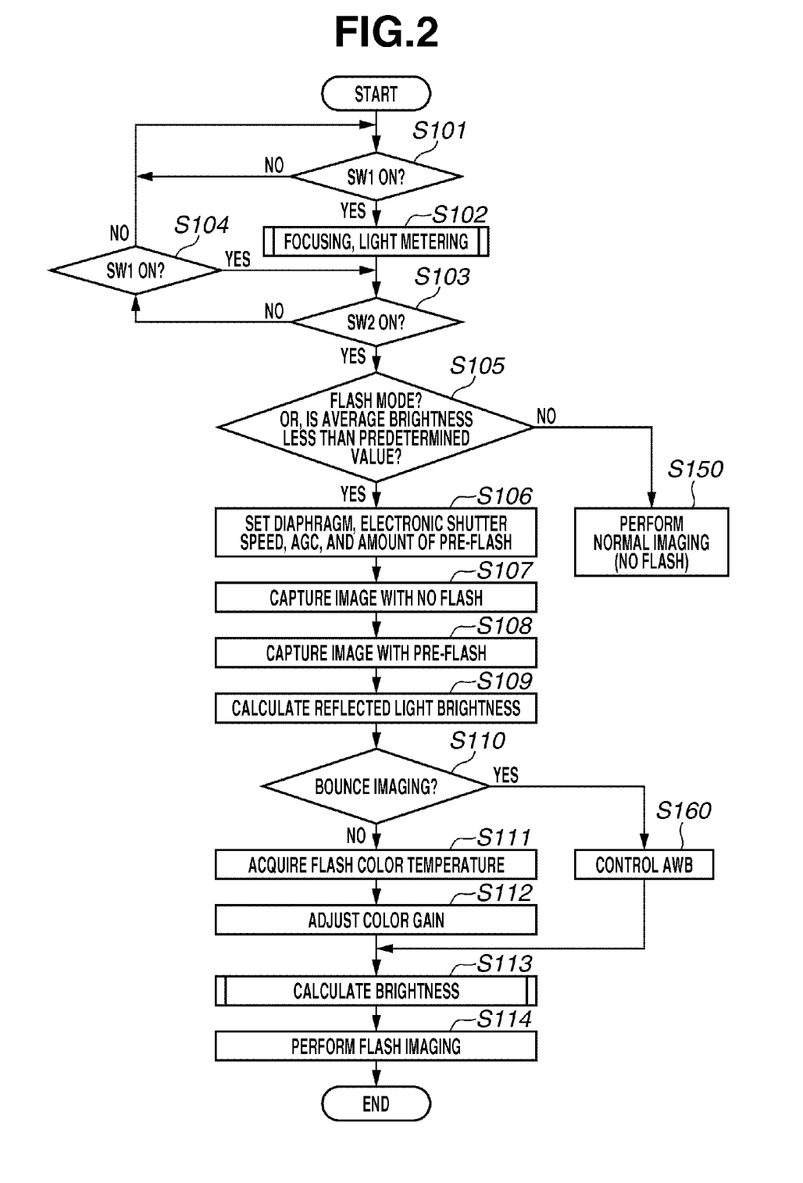
FIG. 2 is a flowchart illustrating imaging processing performed by an imaging apparatus according to the first exemplary embodiment of the present invention.

With reference to the flowchart illustrated in FIGS. 2 to 4 and the image data illustrated in FIG. 5, imaging operation according to the present exemplary embodiment will be described hereinbelow. FIG. 2 is a flowchart illustrating a waiting state before the imaging is performed and the operation until the imaging is started.

In step S101, when the shutter switch SW1 is pressed (YES in step S101), the processing proceeds to step S102. In step S102, focusing and light metering processing is performed on the image data input from the A/D converter 16. The focusing and light-measuring processing performed in step S102 will be described in detail with reference to the flowchart illustrated in FIG. 3.

In step S103, when the shutter switch SW2 is pressed (YES in step S103), the processing proceeds to step S105. In step S104, when the shutter switch SW2 is not pressed (NO in step S103) and further the shutter switch SW1 is canceled (NO in step S104), the processing returns to step S101.

In step S105, based on a result of the light-metering performed in step S102, with reference to a flash mode of the flash or an average brightness value, it is determined whether the average brightness value is less than a predetermined value. The brightness value to be determined herein is not limited to the average brightness value acquired by simple adding and averaging, but may be acquired by weighing and averaging for putting weight on a specific object, or may be the brightness value limited to a region including the specific object.

When it is determined that the average brightness value is not less than the predetermined value (NO in step S105), then in step S150, even when it is determined that the average brightness value is the predetermined value or more in step S105, or when the flash mode is set to no-flash, the normal imaging is performed without the flash.

When it is determined that the average brightness value is less than the predetermined value (YES in step S105), then in step S106, based on the result of the light-metering in step S102, the image processing unit 20 or the system control unit 50 performs AE processing. More specifically, based on the brightness level calculated by the image processing unit 20, control values including the aperture size of the diaphragm, an electronic shutter speed, and the gain are calculated. The system control unit 50 transmits the control values determined according to the calculated control values to the gain control unit 40, the electronic shutter control unit 41, and the diaphragm control unit 43.

Based on the brightness level calculated by the image processing unit 20 and an amount of lens drive based on a distance measurement result, the control values including the aperture size of the diaphragm, the electronic shutter speed, and the gain are set to acquire the brightness level of the reflected light of the specific color at an appropriate level when the flash unit 46 is pre-flashed.

The aperture size of the diaphragm and an amount of pre-flash by the flash are set appropriately not to cause a problem of gradation of the object. Further, to reduce effects of external light as much as possible, the electronic shutter speed is set high, and the gain is set low to reduce noise in the image signal.

In step S107, when the control values including the aperture size, the electronic shutter speed, and the gain are set for the diaphragm 12, the image sensor 14, and the AGC circuit 15, respectively, the object is captured without the flash unit 46 being flashed. The image signal is transmitted to the image processing unit 20 via the image sensor 14, the AGC circuit 15, and the A/D converter 16. After predetermined processing is performed on the image signal, the image signal is stored in the memory 30 as the no-flash image.

In step S108, the image is captured with the flash unit 46 being pre-flashed, and the captured image is transmitted to the image processing unit 20 via the image sensor 14, the AGC circuit 15, and the A/D converter 16. After predetermined processing is performed on the image signal, the image signal is stored in the memory 30 as a pre-flash image.

In step S109, the image processing unit 20 reads no-flash image data and pre-flash image data stored in the memory 30, and then calculates difference between the two types of image data in pixel units to generate data of reflected-light brightness.

The difference between environment light that is a light source of the no-flash image data, and the environment light and the flash light, which is a light source of the pre-flash image data, is calculated to acquire the image data from which the effect of the environment light is removed, and the data of the reflected-light brightness including only the flash light as the light source can be generated.

In step S110, by communicating with the flash unit 46, the flash unit 46 can determine whether bounce imaging is performed.

When it is determined that the bounce imaging is not performed (NO in step S110), then in step S111, color temperature information when the flash is pre-flashed to capture the image is acquired. When a built-in flash is used, the color temperature information previously stored in the image processing unit 20 or the memory 30 is read.

In step S112, white balance is controlled. The color temperature information about the flash unit 46 acquired in step S111 is read from the memory 30, and then the gain for each signal value of the R, G, and B of the image data is adjusted according to the color temperature (spectral characteristics) of the flash unit 46. More specifically, since the light source can be limited to the flash, white balance correction can be performed more accurately.

When it is determined that the bounce imaging is performed (YES in step S110), then in step S160, when the flash unit 46 is set for a bounce state, since the light source is not limited to the flash light, the known AWB processing is performed to adjust the gain of each color of the R, G, and B.

In step S113, based on the gain-adjusted image data, predetermined calculation is performed to calculate a target value for the amount of the flash. A flash control signal based on the calculated target value for the amount of the flash is set for the flash unit 46. The calculation will be described in detail with reference to the flowchart illustrated in FIG. 4 below.

In step S114, based on an amount of main flash set by the flash unit 46, the flash is emitted to perform main imaging of the object.

Figure 3:
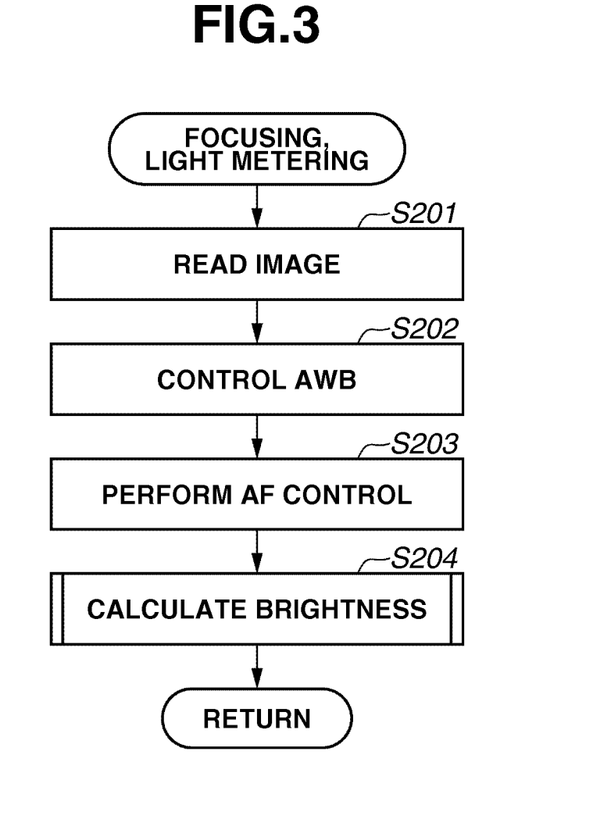
FIG. 3 is a flowchart illustrating imaging processing performed by the imaging apparatus according to the first exemplary embodiment of the present invention.

FIG. 3 is a flowchart illustrating details of focusing and light-metering processing performed in step S102 illustrated in FIG. 2.

In step S201, a charge signal is read from the image sensor 14, and converted into digital data via the A/D converter 16, and then the digital data is input to the image processing unit 20.

In step S202, the image processing unit 20 determines the color temperature of the light source based on the input image data, and then a predetermined gain is applied for each color of each pixel (AWB processing). In step S203, the image processing unit 20 performs the AF processing of a known contrast method using the input image data.

In step S204, predetermined processing is performed on the above-described image data to calculate a target value of an amount of exposure. Based on the calculated target value for the amount of the exposure, adjustment values of the diaphragm, the shutter speed, and the gain are determined. The calculation will be described in detail with reference to the flowchart illustrated in FIG. 4.

Figure 4:
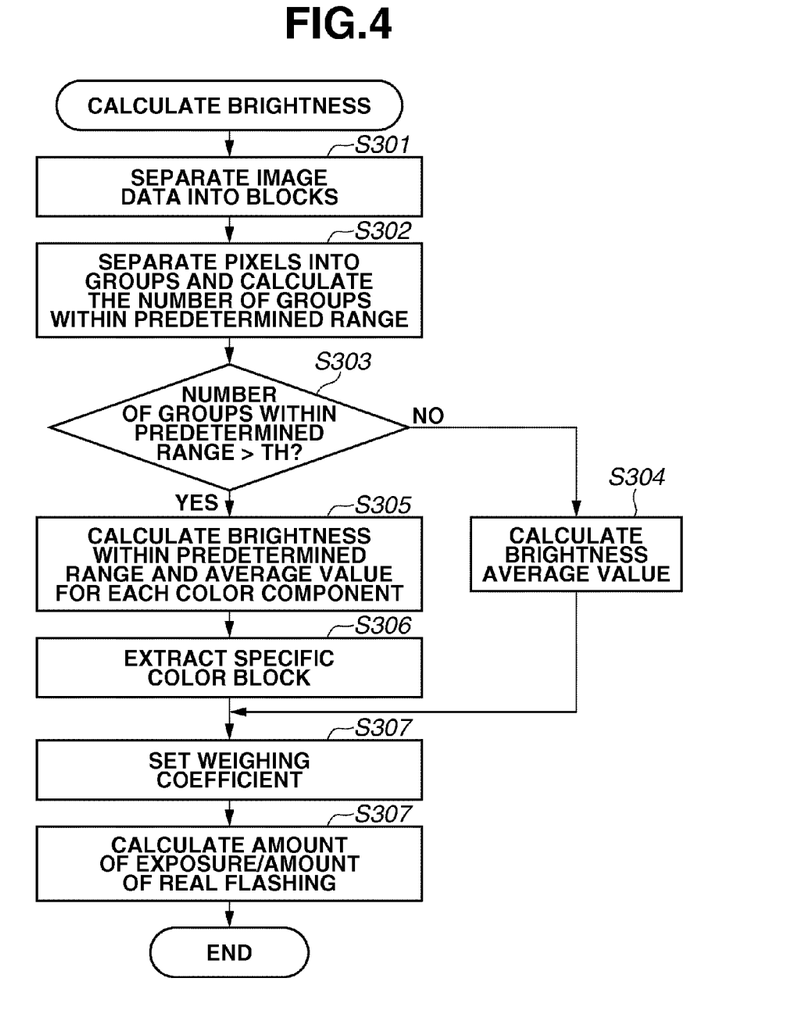
FIG. 4 is a flowchart illustrating imaging processing performed by the imaging apparatus according to the first exemplary embodiment of the present invention.

FIG. 4 is a flowchart illustrating details of the calculation of the brightness performed in step S113 illustrated in FIG. 2 and in step S204 illustrated in FIG. 3. FIGS. 5A to 5J are image diagrams of respective steps illustrated in FIG. 4.

In step S301, the image data is input in step S112 illustrated in FIG. 2 and in step S203 illustrated in FIG. 3, and then separated into measurement blocks having a predetermined area by the image processing unit 20.

Figures 5A, 5D:
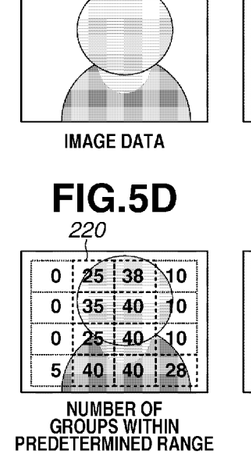
FIGS. 5A to 5J illustrate imaging processing performed by the imaging apparatus according to the first exemplary embodiment of the present invention.
Figure 5B:
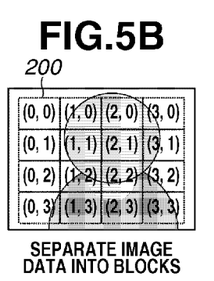

FIG. 5A illustrates an example of the image data in which an image of a person is captured within a linearity range (within the dynamic range) of the image sensor 14 and its background is white out with signal values in a range outside the dynamic range. FIG. 5B is image data acquired by separating the image data illustrated in FIG. 5A into the measurement blocks 200 of 4×4.

In step S302, the image data is separated into pixel groups, each of which is formed of a plurality of pixels including a plurality of color components in the measurement block, and then the number of groups (ratio) is calculated, all of whose pixel outputs are included within the range of linearity of the image sensor 14.

Figure 5C:
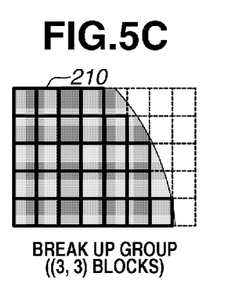

FIG. 5C is an example where the block of (3, 4) is separated into 40 groups. A group, all of whose pixel outputs of a plurality of the color components are included within a predetermined range corresponding to the linearity range (dynamic range) of the image sensor 14, is defined as a group 210.

FIG. 5D is acquired by calculating the number of the groups within the predetermined range for each block. As illustrated in the block of (0, 0), when the background is white out, the number of groups within the predetermined range is "0".

In step S303, it is determined whether a predetermined number of groups or more are included within the predetermined range.

FIG. 5D displays, when a predetermined number is defined as 20 and when it is determined that the predetermined number of blocks or more are included, the blocks as blocks 220 within the predetermined range.

Figure 5E:
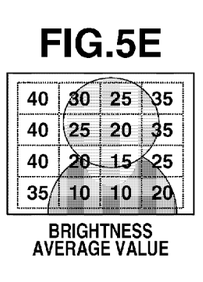

When it is determined that the predetermined number of groups or more is not included within the predetermined range (NO in step S303), then in step S304, the average value of the brightness of entire pixels within the block, which is the average value of overall brightness, is calculated in block units separated in the step S301. FIG. 5E illustrates the average value of the brightness calculated for each block.

Figure 5F:
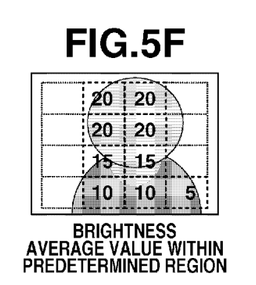
Figure 5G:
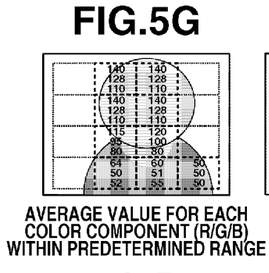

When it is determined that the predetermined number of groups or more is included within the predetermined range (YES in step S303), then in step S305, the average value of the brightness acquired using only the pixel groups, whose pixel output is each included within the predetermined range, and the average value of each color component are calculated for each block. FIGS. 5F and 5G illustrate the average value of the brightness acquired using only the pixel group included within the predetermined range in the block 220 within the predetermined range and the average value of the color component for each color component.

In step S306, it is determined whether the average value of each color component within the predetermined range acquired in step S305 is included within a predetermined region in a color space indicating the specific color, and then the included block is determined to be a specific block.

Figure 5H:
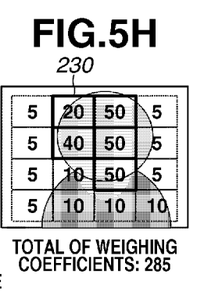

In step S307, depending on a determination result of the specific color block and the number of groups within the predetermined range, the weighting coefficient for each block is adjusted. The adjustment of the weighting coefficient will be described in detail with reference to FIG. 7. FIG. 5H indicates as a specific color block 230 the result when a skin color is extracted as the specific color, and then indicates the weighting coefficient according to the specific color.

In step S308, by adding and averaging the weighting coefficient calculated in step S306 and the average value of the brightness for each block detected in step S304 or step S306, the amount of the exposure for capturing the specific color with optimum exposure and the target value for the amount of the main flash are calculated.

Figure 5I:
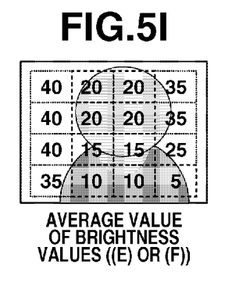

FIG. 5I indicates the average value of the brightness for each block detected in step S304 or step S306. The blocks 220 within the predetermined range have the average values of the brightness within the predetermined range indicated in FIG. 5F, and blocks other than the blocks within the predetermined range have the average values of the brightness indicated in FIG. 5E as the average value of the brightness.

Figure 5J:
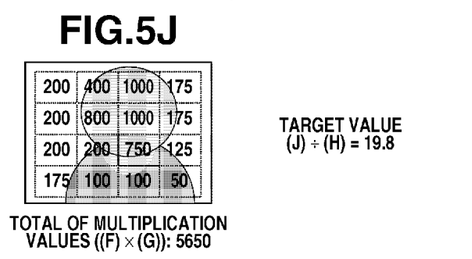

FIG. 5J indicates the calculation of the target value of 19.8 by performing division processing (adding and averaging processing) for dividing a total "5,650" of values, which is acquired by multiplying the average value of the brightness indicated in FIG. 5I by the weighting coefficient indicated in FIG. 5H, by a total "285" of the weighting coefficient.

Figure 6:
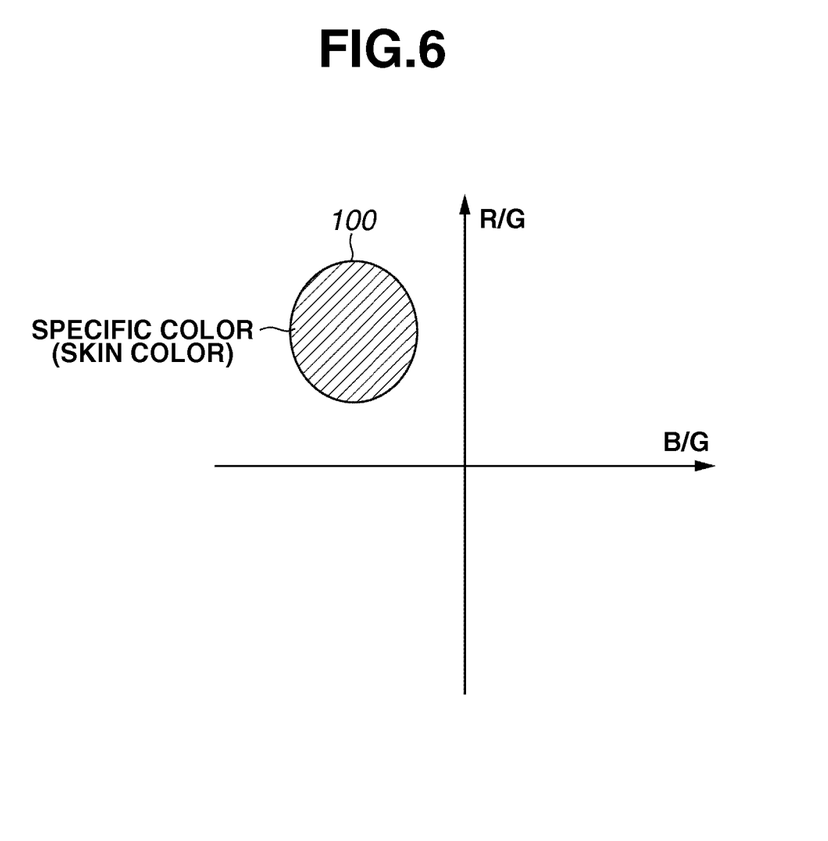
FIG. 6 briefly illustrates a color difference plane to be used as a reference when a specific color is extracted.

Subsequently, in the above-described flowcharts illustrated in FIGS. 2 and 3, a method for extracting the object in the specific color will be described in detail with reference to FIG. 6. FIG. 6 is a simplified graph illustrating a color difference plane with a vertical axis R/G and a horizontal axis B/G.

When the specific color is extracted, the color temperature of the light source in an imaging environment is determined to control the AWB. A known technique is used for estimating the color temperature of the light source based on brightness information and color information acquired from the image in a screen, and adjusting the gains of the R, G, and B, so that the pixel outputs of the respective R, G, and B are at the same level when a white object is captured.

If the flash is not set to perform the bounce imaging when the flash is used, the known color temperature of the pre-flash is used as the color temperature of the light source.

Since, when the flash unit 46 is set to perform the bounce imaging, the flash light reaches the object via a reflection object in the vicinity, the color temperature (spectral characteristic) changes according to a reflection ratio of the reflection object. Therefore, when the bounce imaging is performed, based on the color information about the image data or the like, the WB is controlled by a known method.

Based on the image data on which the WB is controlled, the average value of each color component of the block is defined as a color difference signal of a B/G value and an R/G value. On a two-dimensional plane (color space) of the color difference signal, since a range in which the specific color is plotted is determined, in step S306, it is determined whether the average value of each color component within the dynamic range for each block is included within the predetermined range indicating the specific color in the color space.

For example, when the skin color is extracted as the specific color, the skin color is included in an upper left (second quadrant) range in the color space illustrated in FIG. 6. Thus, a specific-color frame is set in the upper left range to extract the skin color.

If even one color of the pixel of the R, G, and B of the group is positioned outside the linearity range of the image sensor 14, a ratio among the R, G, and B changes, and thus the color is plotted at a different position in the color space.

Thus, it is determined whether the average value of each color component acquired using only the pixel group, which includes several pixels including a plurality of color components in the block, whose all pixel outputs are included within the predetermined range is included in the specific-color frame in the color space.

When the number of the groups within the linearity range in the block is less than the predetermined number (less than a predetermined group ratio), since a ratio of the specific color in the block is originally small, the determination is not performed whether the block is included in the specific-color frame.

Further, when an external flash is used, by communicating with the flash unit 46, the color temperature when the flash unit 46 is pre-flashed is acquired. When the built-in flash is used, data previously stored in the image processing unit or the memory is read.

Subsequently, the no-flash image data acquired by capturing the image of the object without the flash is acquired, and then stored in the memory 30. The pre-flash image data acquired by capturing the image of the object with the flash unit 46 being flashed is stored in the memory 30, and then difference between the two types of the stored image data is calculated in pixel units to generate data of reflected-light brightness The difference between environment light that is the light source of the no-flash image data, and the environment light and the flash light, which is the light source of the pre-flash image data, is calculated to acquire reflected-light image data from which the effect of the environment light is removed, and the light source can be specified to the flash light.

The spectral characteristic when the flash unit 46 pre-flashes can be acquired by communicating with the flash unit 46 or by reading the data previously stored in the image processing unit 20 or the memory 30.

Since each of the spectrum characteristic of the flash unit 46 and that of the image sensor 14 always have a constant value, the data of the spectrum characteristic of the flash and the image sensor is previously stored in the image processing unit 20 or the memory 30. The image processing unit 20 analyzes data of the color temperature and that of the spectrum characteristic and, based on the analysis result, the gains of the R, G, and B (WB adjustment value) of the reflected-light image data is adjusted to enable the accurate WB adjustment.

Subsequently, a method for adjusting the weighting coefficient illustrated in the flowcharts in FIGS. 2 and 3 will be described in detail with reference to FIG. 7.

Figure 7:
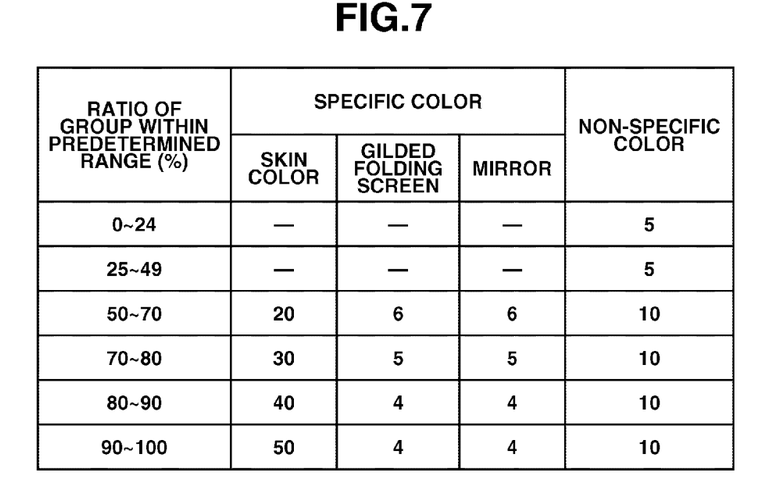
FIG. 7 is a table illustrating a method for adjusting weight coefficients.

FIG. 7 is a table illustrating the weighting coefficients for respective specific colors and non-specific colors. According to the number of the groups within the predetermined range, the weighting coefficient value is adjusted.

For example, when the skin color is extracted as the specific color, in order to capture the region with appropriate exposure, a large weighting coefficient value is set. If a mirror or a gilded folding screen that have high reflection ratios are detected as the specific color when the flash is emitted, to reduce the effect of the reflected light, a smaller weighting coefficient value compared to those of other blocks is set.

Further, also when the number of the groups within the predetermined region in the block of the non-specific color is small, the weighting coefficient is set small. This is because the effect given by the object outside the dynamic range can be reduced in the screen.

As described above, according to the present exemplary embodiment, by the processing for detecting the specific color based on the difference between the flash image and the no-flash image, the pixel group is detected in which the average value of each color component within the dynamic range in each block is included within the predetermined range indicating the specific color in the color space. Based on the ratio of the pixel group in each block, the weighing coefficient of each block is determined to control final exposure.

With such processing, the effect given by the object outside the dynamic range can be reduced and the skin color of a person can be captured with the appropriate exposure. Further, the imaging can be performed with the appropriate exposure for reducing the effect of the reflected light of the mirror and the gilded folding screen having the high reflection ratio.

As described above, the exemplary embodiments of the present invention have been described, however, the present invention is not limited thereto, and other variations and modifications can be made in the scope of the invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-155908 filed Jul. 14, 2011, which is hereby incorporated by reference herein in its entirety.

What is claimed is:

1. An imaging apparatus comprising:
   an imaging unit;
   a generation unit configured to generate image data including a plurality of color components from output of the imaging unit;
   a brightness calculating unit configured to calculate, for a plurality of light measuring blocks into which the image data is separated, an average value of brightness value of small blocks including a plurality of color components whose pixel output is included within a predetermined range, wherein each light measurement block includes a plurality of small blocks;
   a specification unit configured to specify a specific light measurement block including a predetermined number or more of the small blocks; and
   an exposure-amount calculation unit configured to calculate an amount of exposure when the imaging unit captures an image using the average value as a brightness value of the specific light measurement block.

2. The imaging apparatus according to claim 1, further comprising a determination unit configured to determine whether the specific light measurement block is a specific-color block, in which an average value of each color component within the predetermined range is a value within a range indicating the specific color in a color space, and
   wherein the exposure-amount calculation unit calculate the amount of exposure using a value, as a brightness value of each specific-color block, acquired by multiplying the value of the brightness by a weight based on a determination result by the determination unit.

3. The imaging apparatus according to claim 1, further comprising an entire-brightness averaging unit configured to calculate, for each light measurement block other than specific light measurement blocks, an entire-brightness average value of entire pixels in the light measurement block,
   wherein the exposure-amount calculation unit is configured to calculate the amount of the exposure using the entire-brightness average value as a brightness value of the light measurement block other than specific light measurement blocks.

4. The imaging apparatus according to claim 2,
   wherein the generation unit is configured to generate no-flash image data captured by the imaging unit without a flash being pre-flashed and pre-flash image data captured by the imaging unit with the flash being pre-flashed, and then reflected-light image data by difference calculation between the no-flash image data and the pre-flash image data, to generate the image data.

5. The imaging apparatus according to claim 4,
   wherein the exposure-amount calculation unit is configured to calculate an amount of flash by the flash using a value acquired by multiplying the average value of the brightness by a weight based on the determination result by the determination unit as the brightness value of the specific light measurement block.

6. The imaging apparatus according to claim 4,
   wherein the determination unit is configured to determine a specific-color block using previously-stored data of color temperature and/or that of spectrum characteristic when the flash is pre-flashed.

7. The imaging apparatus according to claim 4, further comprising:
   a white balance control unit configured to adjust white balance of the image data;
   wherein the white balance control unit is configured to, in a case of bounce imaging using the flash, calculate a white balance adjustment value from the reflected-light image data to control the white balance.

8. The imaging apparatus according to claim 2,
   wherein the determination unit is configured to set a range indicating the specific color in the color space based on an imaging mode.

9. The imaging apparatus according to claim 2,
wherein the exposure-amount calculation unit is configured to multiply a larger weight for the specific light measurement block determined to be a specific-color block by the determination unit than for a light measurement block that is not determined to be a specific-color block thereby.

10. The imaging apparatus according to claim 1, wherein the predetermined range corresponds to a dynamic range of the imaging unit.

11. A method for controlling an imaging apparatus including imaging unit and generation unit configured to generate image data including a plurality of color components from output of the imaging unit, the method comprising:
calculating, for a plurality of light measurement blocks into which the image data is separated, an average value of brightness value of small blocks including a plurality of color components whose pixel output is included within the predetermined range, wherein each light measurement block includes a plurality of small blocks;
specifying a specific light measurement block including a predetermined number or more of the small blocks whose pixel output is included within the predetermined range; and
calculating an amount of exposure when the imaging unit captures an image using the average value as a brightness value of the specific light measurement block.

12. A non-transitory computer-readable storage medium storing a program which causes a computer to execute each process of a method for controlling the imaging apparatus according to claim 11.

13. An imaging apparatus comprising;
an imaging unit configured to capture an image of an object;
a brightness calculation unit configured to calculate a brightness value in each of light measurement areas based on image data acquired by capturing an image of an object by the imaging unit;
a determination unit configured to determine whether there are a predetermined number or more of small areas, output values of which are within a predetermined range, among a plurality of small areas included in each of the light measurement areas; and
an exposure-amount calculation unit configured to calculate an amount of exposure based on a plurality of brightness values calculated by the brightness calculation unit,
wherein the brightness calculation unit is configured to calculate the brightness value based on only the output values of the small areas within the predetermined range in the light measurement areas in which the determination unit determines that there are the predetermined number or more of small areas, output values of which are within the predetermined range.

14. The imaging apparatus according to claim 13, further comprising:
a decision unit configured to decide a weight coefficient for each of the light measurement areas,
wherein the decision unit is configured to decide a weight coefficient according to a number or a ratio of small areas, color components of the output values of which are within a range indicating a specific color in a color space, in the light measurement areas in which the determination unit determines that there are the predetermined number or more of small areas, output values of which are within the predetermined range, and
wherein the exposure-amount calculation unit is configured to calculate an exposure amount based on the brightness values calculated by the brightness calculation unit and the weight coefficient decided by the decision unit.

15. The imaging apparatus according to claim 13, wherein the brightness value calculation unit is configured to calculate the brightness value based on at least output values of small areas not within the predetermined range in light measurement areas in which the determination unit determines that there are not the predetermined number or more of small areas, output values of which are within the predetermined range.

16. The imaging apparatus according to claim 13, wherein the determination unit is configured to determine whether there are the predetermined number or more of small areas, output values of which are within the predetermined range, based on whether a number of small areas, output values of which are within the predetermined range, is a predetermined number or more.

17. The imaging apparatus according to claim 13, wherein the determination unit is configured to determine whether there are the predetermined number or more of small areas, output values of which are within the predetermined range, based on whether a ratio of small areas, output values of which are within the predetermined range, is a predetermined ratio or more.

18. The imaging apparatus according to claim 14, wherein the decision unit is configured to decide a larger weight coefficient, in the light measurement areas in which the determination unit determines that there are the predetermined number or more of small areas, output values of which are within the predetermined range, in a case where a number or a ratio of small areas, color components of the output values of which are within a range indicating a skin color in the color space, is large than in a case where the number or the ration of small areas, color components of the output values of which are within a range indicating the skin color in the color space, is small.

19. The imaging apparatus according to claim 14, wherein the decision unit is configured to decide a smaller weight coefficient, in the light measurement areas in which the determination unit determines that there are the predetermined number or more of small areas, output values of which are within the predetermined range, in a case where a number or a ratio of small areas, color components of the output values of which are within a range indicating a color corresponding to a gilded folding screen in the color space, is large than in a case where the number or the ration of small areas, color components of the output values of which are within a range indicating the color corresponding to the gilded folding screen in the color space, is small.

20. The imaging apparatus according to claim 13, wherein the brightness calculation unit is configured to calculate an average brightness value of the small areas, output values of which are within the predetermined range, as the brightness value, in the light measurement areas in which the determination unit determines that there are the predetermined number or more of small areas, output values of which are within the predetermined range.

21. The imaging apparatus according to claim 13, wherein the brightness calculation unit is configured to calculate an average brightness value of all small areas included in a light measurement area as the brightness value, in the light measurement areas in which the determination unit determines that there are not the predetermined number or more of small areas, output values of which are within the predetermined range.

22. The imaging apparatus according to claim 13, wherein the predetermined range corresponds to a dynamic range of the imaging unit.

23. A method for controlling an imaging apparatus, the method comprising: calculating a brightness value in each of light measurement areas based on image data acquired by capturing an image of an object by an imaging unit;
- determining whether there are a predetermined number or more of small areas, output values of which are within a predetermined range, among a plurality of small areas included in each of the light measurement areas; and
- calculating an amount of exposure based on a plurality of calculated brightness values,
- wherein the brightness value is calculated based on only the output values of the small areas within the predetermined range in the light measurement areas in which it is determined that there are the predetermined number or more of small areas, output values of which are within the predetermined range.

24. A non-transitory computer-readable storage medium storing a program which causes a computer to execute each process of the method for controlling the imaging apparatus according to claim 23.

* * * * *